(12) United States Patent
Knutson et al.

(10) Patent No.: US 11,472,136 B2
(45) Date of Patent: Oct. 18, 2022

(54) STIFFENER ASSEMBLY APPLICATION SYSTEM WITH CARRIER FILM SET

(71) Applicant: The Boeing Company, Chicago, IL (US)

(72) Inventors: Samuel James Knutson, Ladson, SC (US); Brian Timothy Peters, North Charleston, SC (US); Raviendra Suriyaarachchi, Ladson, SC (US); James R. Kendall, Mount Pleasant, SC (US); Paul D. Shaw, Charleston, SC (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 16/415,952

(22) Filed: May 17, 2019

(65) Prior Publication Data
US 2020/0361161 A1 Nov. 19, 2020

(51) Int. Cl.
| | | |
|---|---|---|
| *B29C 70/32* | (2006.01) | |
| *B64C 1/06* | (2006.01) | |
| B29C 65/00 | (2006.01) | |
| B29D 99/00 | (2010.01) | |
| B29L 31/30 | (2006.01) | |
| B32B 37/10 | (2006.01) | |
| B64C 1/00 | (2006.01) | |

(52) U.S. Cl.
CPC ............. *B29C 70/32* (2013.01); *B64C 1/068* (2013.01); *B29C 66/61* (2013.01); *B29C 66/71* (2013.01); *B29C 66/73752* (2013.01); *B29D 99/0014* (2013.01); *B29L 2031/3082* (2013.01); *B32B 37/10* (2013.01); *B64C 2001/0072* (2013.01)

(58) Field of Classification Search
CPC ..... B29C 70/32; B29C 70/541; B29C 70/543; B29C 70/549; B29C 33/307; B29C 31/085; B29C 66/61; B29C 66/71; B29C 66/73752; B29C 65/7802; B29C 65/7841; B29C 65/7858; B29C 65/787; B64C 1/068; B64C 2001/0072; B29D 99/0014; B32B 37/10; B29L 2031/3082; Y02T 50/40
See application file for complete search history.

(56) References Cited

U.S. PATENT DOCUMENTS

| | | | | |
|---|---|---|---|---|
| 4,836,765 | A | * | 6/1989 | Kornitzky ........... B29C 43/3607 425/388 |
| 9,199,417 | B1 | | 12/2015 | Rotter et al. |
| 9,221,235 | B1 | | 12/2015 | Rotter et al. |
| 9,221,236 | B1 | | 12/2015 | Rotter et al. |
| 9,272,495 | B1 | | 3/2016 | Robins et al. |

FOREIGN PATENT DOCUMENTS

EP 3281861 A1 2/2018

OTHER PUBLICATIONS

"Film—definition of film by The Free Dictionary" from thefreedictionay.com Jan. 2022.*
Extended European Search Report dated Oct. 23, 2020 regarding European Application No. 20165645.1; 7 pgs.

* cited by examiner

*Primary Examiner* — John L Goff, II
(74) *Attorney, Agent, or Firm* — Yee & Associates, P.C.

(57) ABSTRACT

A carrier film set configured to apply a number of stiffener assemblies to a layup mandrel, the carrier film set comprising: a number of alignment features configured to align the carrier film set relative to the layup mandrel; and a number of indexing features configured to index the number of stiffener assemblies onto the carrier film set.

20 Claims, 8 Drawing Sheets

STIFFENER ASSEMBLY APPLICATION SYSTEM WITH CARRIER FILM SET

BACKGROUND INFORMATION

1. Field

The present disclosure relates generally to composite manufacturing and more specifically to positioning composite stiffeners for stiffened composite structures.

2. Background

A stiffened composite structure has a plurality of composite stiffeners joined or bonded to a composite skin. The composite stiffeners may be joined or bonded to the composite skin prior to or following the curing of the composite skin.

In some bonding processes, uncured composite stiffeners are positioned onto a layup mandrel prior to laying up a plurality of composite plies over the layup mandrel. Components of a composite stiffener may be laid up sequentially layer by layer directly onto the layup mandrel. Laying up components of a composite stiffener directly onto the layup mandrel takes at least one of an undesirable amount of time or an undesirable amount of operator labor.

Therefore, it would be desirable to have a method and apparatus that takes into account at least some of the issues discussed above, as well as other possible issues.

SUMMARY

An illustrative embodiment of the present disclosure provides a carrier film set configured to apply a number of stiffener assemblies to a layup mandrel. The carrier film set comprises a number of alignment features configured to align the carrier film set relative to the layup mandrel, and a number of indexing features configured to index the number of stiffener assemblies onto the carrier film set.

Another illustrative embodiment of the present disclosure provides a stiffener assembly application system configured to apply a number of stiffener assemblies to a layup mandrel. The stiffener assembly application system comprises a carrier film set comprising a number of alignment features configured to align the carrier film set relative to the layup mandrel and a number of indexing features configured to index the number of stiffener assemblies onto the carrier film set, and a conveyor system having a movement system configured to propel the carrier film set towards the layup mandrel.

Yet another illustrative embodiment of the present disclosure provides a method of applying a number of stiffener assemblies to a layup mandrel. A carrier film set is positioned onto a conveyor system, the carrier film set comprising a number of indexing features configured to index the number of stiffener assemblies onto the carrier film set. A number of stiffener assemblies is applied to the carrier film set. The carrier film is aligned relative to the layup mandrel using a number of alignment features of the carrier film set. The number of stiffener assemblies is applied to the layup mandrel as the carrier film set is propelled towards the layup mandrel using the conveyor system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that large and complex tooling in composite manufacturing involves large upfront capital investment. For reusable tooling, product cycle time influences the total capital investment for manufacturing multiple parts. For example, reducing product cycle time increases the quantity of parts that a single tool can create in a time period.

For manufacturing composite fuselages for aircraft, a large mandrel is utilized for layup of the composite materials. Composite material is laid up and then cured on the mandrel. In some illustrative examples, the mandrel may be referred to as a "layup mandrel," or a "layup and cure mandrel." The layup mandrel is an expensive and specialized piece of tooling. Reducing the flow time for a fuselage on the layup mandrel increases the quantity of fuselages that may be manufactured using the same layup mandrel during a time period.

The illustrative embodiments recognize and take into account that aircraft also have stiffened wing skins. Additionally, many other composite structures, including boats, have large stiffened composite skins.

The illustrative embodiments recognize and take into account that it may be desirable to cure stiffeners while in contact with a composite skin. To cure stiffeners while in contact with a composite skin, the stiffeners are within cavities of a layup mandrel and the composite skin is laid up over the stiffeners and cavities.

The illustrative embodiments recognize and take into account that stiffeners may be laid up onto a separate tool other than a layup mandrel. Laying up a stiffener on a separate tool and placing the resulting stiffener assembly onto a layup mandrel will reduce the placement time of the stiffener onto the layup mandrel. Laying up a stiffener on a separate tool may be referred to as laying up the stiffener "offline." By laying up stiffeners "offline," multiple stiffeners may be laid up simultaneously, significantly reducing the time spent positioning stiffeners onto the layup mandrel.

Stiffeners laid up on a separate tool may be referred to as "kitted stringers," or stiffener assemblies. The illustrative embodiments recognize and take into account that stiffener assemblies laid up on a separate tool will be transferred to the layup mandrel. Stiffener assemblies for aircraft components are very long components. The illustrative embodiments recognize and take into account that transporting and applying a stiffener assembly manually by operators may be at least one of undesirably cumbersome or undesirably time-consuming.

The illustrative embodiments recognize and take into account that it would be desirable to accurately apply stiffener assemblies onto a layup mandrel while reducing at least one of the operator time or cost. The illustrative embodiments further recognize and take into account that it would be desirable to apply stiffener assemblies onto a layup mandrel with a system having a low amount of complexity. The illustrative embodiments further recognize and take into account that it would be desirable to apply stiffener assemblies onto a layup mandrel in an automated process.

The illustrative examples provide a stiffener assembly application system configured to apply a number of stiffener assemblies to a layup mandrel. The stiffener assembly application system comprises a carrier film set comprising a number of alignment features configured to align the carrier film set relative to the layup mandrel and a number of indexing features configured to index the number of stiffener assemblies onto the carrier film set, and a conveyor system having a movement system configured to propel the carrier film set towards the layup mandrel.

Figure 1:
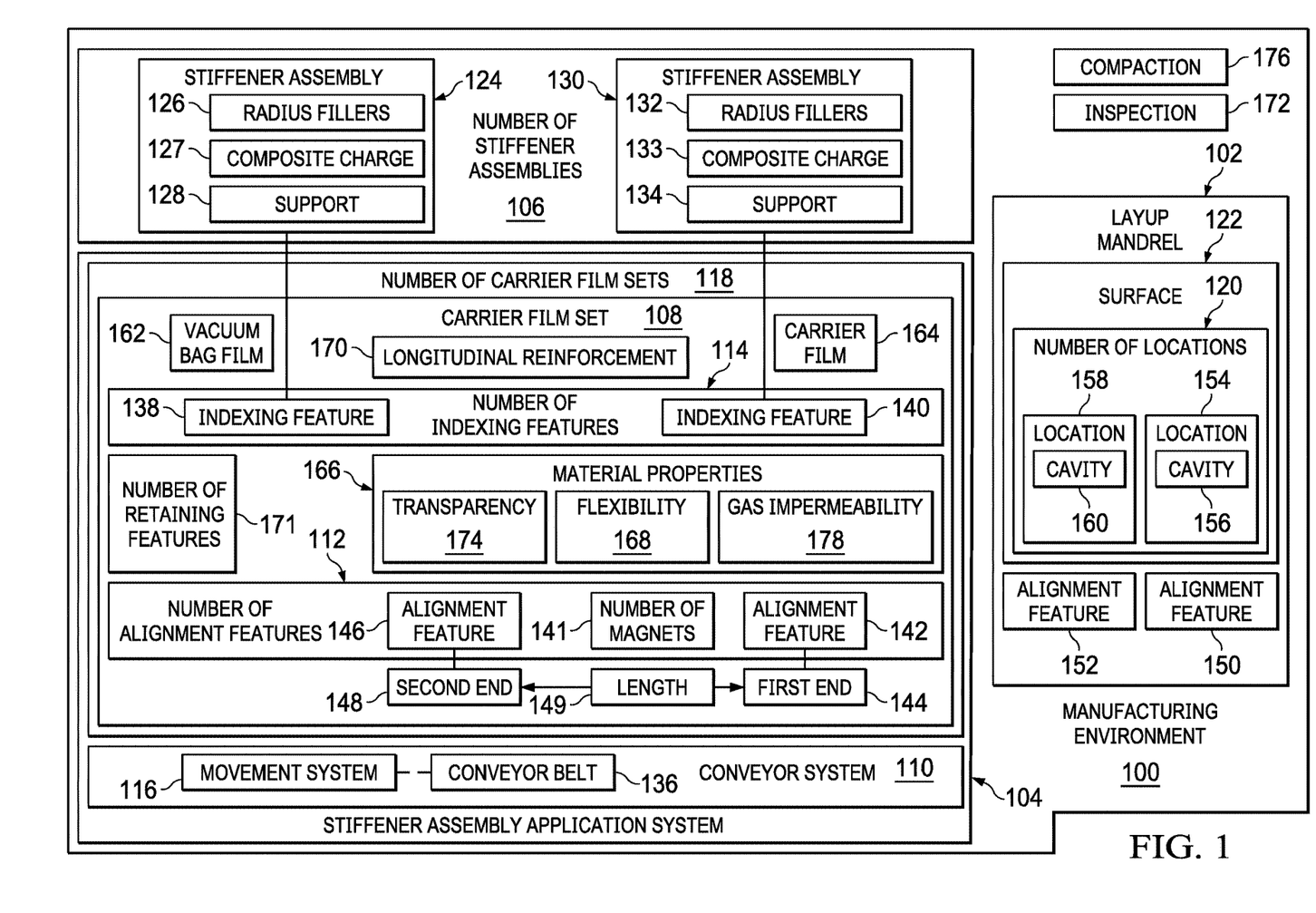
FIG. 1 is an illustration of a block diagram of a manufacturing environment in which a stiffener assembly application system operates in accordance with an illustrative embodiment.

Turning now to FIG. 1, an illustration of a block diagram of a manufacturing environment in which a stiffener assembly application system operates is depicted in accordance with an illustrative embodiment. Manufacturing environment 100 contains layup mandrel 102 and stiffener assembly application system 104 configured to apply number of stiffener assemblies 106 to layup mandrel 102. Stiffener assembly application system 104 includes carrier film set 108 and conveyor system 110. Carrier film set 108 comprises number of alignment features 112 configured to align carrier film set 108 relative to layup mandrel 102 and number of indexing features 114 configured to index number of stiffener assemblies 106 onto carrier film set 108. Conveyor system 110 has movement system 116 configured to propel the carrier film set towards the layup mandrel.

As used herein, a "number of," when used with reference to items, means one or more items. Thus, "number of stiffener assemblies 106" is one or more stiffener assemblies.

As depicted, carrier film set 108 is one of number of carrier film sets 118 configured to be loaded in sequence onto conveyor system 110 to apply additional stiffener assemblies to layup mandrel 102. In some illustrative examples, number of carrier film sets 118 is only carrier film set 108. In these illustrative examples, number of stiffener assemblies 106 contains a quantity of stiffener assemblies sufficient for placing stiffener assemblies at each of number of locations 120 of surface 122 of layup mandrel 102.

In other illustrative examples, a quantity of stiffener assemblies in number of stiffener assemblies 106 is less than a quantity of locations in number of locations 120. In these illustrative examples, additional carrier film sets are present in number of carrier film sets 118 to apply additional stiffener assemblies to layup mandrel 102.

Number of indexing features 114 is configured to aid in positioning number of stiffener assemblies 106. Number of indexing features 114 take any desirable form. In some illustrative examples, number of indexing features 114 take the form of fiducials for alignment of an automated placement system such as a pick and place robot. In some illustrative examples, number of indexing features 114 take the form of reflective features or soft targets for a pick and place robot to visually identify the locations for placement of number of stiffener assemblies 106 onto carrier film set 108.

Each of number of stiffener assemblies 106 comprises radius fillers, a number of composite charges, and a support. For example, stiffener assembly 124 of number of stiffener assemblies 106 comprises radius fillers 126, composite charge 127, and support 128. As another example, stiffener assembly 130 of number of stiffener assemblies 106 comprises radius fillers 132, composite charge 133, and support 134.

Stiffener assembly 124 has any desirable cross-sectional shape. Further, stiffener assembly 124 has any desirable quantity of composite charges. In some illustrative examples, stiffener assembly 124 includes more composite charges other than composite charge 127. In some illustrative examples, number of indexing features 114 is configured to aid in positioning number of stiffener assemblies 106 using a respective composite charge. In some illustrative examples, number of indexing features 114 comprises a number of visible marks corresponding to a desired location for an edge of a composite charge of a respective stiffener assembly of number of stiffener assemblies 106.

Conveyor system 110 of stiffener assembly application system 104 also has conveyor belt 136 configured to support number of stiffener assemblies 106 in a desired orientation. Conveyor belt 136 has any desirable cross-sectional shape. In some illustrative examples, conveyor belt 136 is substantially planar. In other illustrative examples, conveyor belt 136 has features configured to interface with number of stiffener assemblies 106. For example, conveyor belt 136 may have a number of troughs configured to receive number of stiffener assemblies 106.

Carrier film set 108 is positioned onto conveyor system 110. Number of stiffener assemblies 106 are applied to carrier film set 108 and indexed using number of indexing features 114. For example, stiffener assembly 124 may be applied to carrier film set 108 by indexing stiffener assembly 124 using indexing feature 138. As another example, stiffener assembly 130 may be applied to carrier film set 108 by indexing stiffener assembly 130 using indexing feature 140.

Carrier film set 108 is aligned relative to layup mandrel 102 using number of alignment features 112 of carrier film set 108. Number of alignment features 112 has any desirable quantity of alignment features. Number of alignment features 112 takes the form of adhesive, mechanical, magnetic, pneumatic, or any other form of alignment features configured to align carrier film set 108 relative to layup mandrel 102. In some illustrative examples, number of alignment features 112 is number of magnets 141.

As depicted, number of alignment features 112 includes alignment feature 142 associated with first end 144 of carrier film set 108 and alignment feature 146 associated with second end 148 of carrier film set 108. In some illustrative examples, alignment feature 146 is optional. First end 144 and second end 148 of carrier film set 108 are opposite ends of length 149 of carrier film set 108.

In some illustrative examples, to align carrier film set 108 relative to layup mandrel 102, alignment feature 142 interacts with alignment feature 150 of layup mandrel 102. After aligning carrier film set 108 relative to layup mandrel 102, number of stiffener assemblies 106 are applied to layup mandrel 102.

For example, by rotating layup mandrel 102 as carrier film set 108 is propelled towards layup mandrel 102 by conveyor system 110, number of stiffener assemblies 106 are applied to layup mandrel 102. As carrier film set 108 is propelled towards layup mandrel 102, stiffener assembly 130 is applied to location 154. In some illustrative examples, location 154 is cavity 156 in surface 122 of layup mandrel 102. As carrier film set 108 is propelled towards layup mandrel 102, stiffener assembly 124 is applied to location 158. In some illustrative examples, location 158 is cavity 160 in surface 122 of layup mandrel 102.

Carrier film set 108 is configured to apply number of stiffener assemblies 106 to layup mandrel 102. Carrier film set 108 comprises number of alignment features 112 configured to align carrier film set 108 relative to layup mandrel 102 and number of indexing features 114 configured to index number of stiffener assemblies 106 onto carrier film set 108.

As used herein, a "set" of items is one or more items. Carrier film set 108 comprises one or more films. Carrier film set 108 comprises at least one of vacuum bag film 162 or carrier film 164. Material properties 166 of carrier film set 108 are selected for application and processing of number of stiffener assemblies 106. Material properties 166 of carrier film set 108 are selected based on desired usage of carrier film set 108.

Carrier film set 108 has flexibility 168 configured to conform carrier film set 108 to surface 122 of layup mandrel 102. Flexibility 168 is selected such that carrier film set 108 accurately places number of stiffener assemblies 106 in number of locations 120. In some illustrative examples, carrier film set 108 comprises longitudinal reinforcement 170. In some illustrative examples, longitudinal reinforcement 170 is a portion of one of the films of carrier film set 108. In some illustrative examples, longitudinal reinforcement 170 is a material property of one of the films of carrier film set 108. In some illustrative examples, longitudinal reinforcement 170 is a separate layer. In some illustrative examples, longitudinal reinforcement 170 is a reinforcement in a lash tension direction for carrier film set 108.

In some illustrative examples, at least one film of carrier film set 108 is retained on layup mandrel 102 after number of stiffener assemblies 106 is placed in number of locations 120. In these illustrative examples, the at least one film of carrier film set 108 is present as additional operations are performed on number of stiffener assemblies 106.

In some illustrative examples, second end 148 of carrier film set 108 has alignment feature 146 to secure second end 148 of carrier film set 108 to layup mandrel 102. Alignment feature 146 interacts with alignment feature 152 of layup mandrel 102. After number of stiffener assemblies 106 are applied to layup mandrel 102, alignment feature 146 may be used to secure second end 148 of carrier film set 108 to layup mandrel 102 in illustrative examples in which at least one film of carrier film set 108 is retained on layup mandrel 102.

When at least a portion of carrier film set 108 is retained on layup mandrel 102, carrier film set 108 comprises number of retaining features 171 configured to retain at least a portion of carrier film set 108 on layup mandrel 102. In some illustrative examples, number of alignment features 112 acts as number of retaining features 171. For example, when number of alignment features 112 take the form of number of magnets 141, number of magnets 141 act as number of retaining features 171. As another example, mechanical implementations of number of alignment features 112, such as tabs and slots, fasteners, clamps, or other mechanical features, act as number of retaining features 171.

In other illustrative examples, number of alignment features 112 and number of retaining features 171 are separate features. In some illustrative examples, number of alignment features 112 take the form of mechanical or visual features. In some illustrative examples, number of retaining features 171 take the form of pneumatic or adhesive features.

In some illustrative examples, inspection 172 of number of stiffener assemblies 106 is performed after application of number of stiffener assemblies 106 on layup mandrel 102. In some illustrative examples, inspection 172 is performed to verify presence of number of stiffener assemblies 106 in number of locations 120. When carrier film set 108 is retained on layup mandrel 102 after placing number of stiffener assemblies 106 on layup mandrel 102, inspection 172 may take place through carrier film set 108. In these illustrative examples, carrier film set 108 has material properties 166 configured to facilitate inspection 172 through carrier film set 108 or portion of carrier film set 108 retained on layup mandrel 102.

Inspection 172 takes any desirable form. In some illustrative examples, inspection 172 is a thermal inspection. In some illustrative examples, inspection 172 is a visual inspection.

When inspection 172 is a visual inspection, transparency 174 is configured to accommodate visual inspection of the number of stiffener assemblies through the carrier film. When inspection 172 is a visual inspection, at least a portion of carrier film set 108 is configured to be retained on layup mandrel 102, and the at least a portion of carrier film set 108 has transparency 174 configured to accommodate visual inspection 172 of number of stiffener assemblies 106 through the at least a portion of carrier film set 108. In some illustrative examples, when carrier film set 108 is retained on layup mandrel 102, carrier film set 108 has transparency 174 configured to accommodate visual inspection 172 of number of stiffener assemblies 106 through carrier film set 108.

After placement of number of stiffener assemblies 106 on layup mandrel 102, compaction 176 is performed on number of stiffener assemblies 106. Compaction 176 is performed under a vacuum. To apply compaction 176 to number of stiffener assemblies 106, number of stiffener assemblies 106 is sealed under a vacuum bagging material, or other suitable sealing material.

When carrier film set 108 is retained on layup mandrel 102, compaction 176 may be performed on number of stiffener assemblies 106 by pulling a vacuum on number of stiffener assemblies 106. In some illustrative examples, carrier film set 108 has gas impermeability 178 sufficient to utilize carrier film set 108 as a vacuum bagging material.

In some illustrative examples, carrier film set 108 is only partially retained on layup mandrel 102. In some illustrative examples, at least a portion of carrier film set 108 is configured to be retained on layup mandrel 102, and the at least a portion of carrier film set 108 has gas impermeability 178 sufficient to utilize the at least a portion of carrier film set 108 as a vacuum bagging material.

When at least a portion of carrier film set 108 is retained on layup mandrel 102, the portion of carrier film set 108 retained on layup mandrel 102 is sealed to at least one of layup mandrel 102 or another film on layup mandrel 102. The portion of carrier film set 108 is sealed in any desirable fashion. Carrier film set 108 may be sealed using at least one of an adhesive, a lip seal, a magnetic seal, or any other desirable type of sealing method.

In some illustrative examples, no portion of carrier film set 108 is retained on layup mandrel 102. In these illustrative examples, a separate vacuum bagging film is sealed over number of stiffener assemblies 106 to perform compaction 176 on number of stiffener assemblies 106. In these illustrative examples, material properties 166 of carrier film set 108 may be selected only for application of number of stiffener assemblies 106 to layup mandrel 102.

In some illustrative examples, when no portion of carrier film set 108 is retained on layup mandrel 102, carrier film set 108 is cycled through a loop. In some of these illustrative examples, after a portion of carrier film set 108 places number of stiffener assemblies 106, the portion of carrier film set 108 travels beneath conveyor system 110 and returns to the top of conveyor belt 136 to receive additional stiffener assemblies to be placed onto layup mandrel 102 or another layup mandrel.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of stiffener assemblies 106 is depicted as only having two stiffener assemblies: stiffener assembly 124 and stiffener assembly 130, number of stiffener assemblies 106 has any desirable quantity of stiffener assemblies. In some illustrative examples, number of stiffener assemblies 106 has more than two stiffener assemblies. In other illustrative examples, number of stiffener assemblies 106 has only one stiffener assembly.

As another example, number of carrier film sets 118 has any desirable quantity of carrier film sets. As depicted, number of carrier film sets 118 has one carrier film set, carrier film set 108. In other illustrative examples, number of carrier film sets 118 includes more than one carrier film set. Although not depicted, each additional carrier film set in number of carrier film sets 118 has a respective associated number of stiffener assemblies.

As yet another example, carrier film set 118 includes any desirable quantity of films. Carrier film set 118 includes one or more films having any desirable material properties 166.

In a further example, conveyor system 110 may have any desirable design to support and propel number of carrier film sets 118. Further, conveyor system 110 may have any desirable design to support and propel a desired length of carrier film set 108.

In some illustrative examples, conveyor system 110 has more than one conveyor belt. In some illustrative examples, conveyor system 110 has more than one movement system.

By locating two movement systems end to end, number of stiffener assemblies 106 can be manufactured and transferred toward layup mandrel 102 in real time. As one carrier film set with a respective number of stiffener assemblies is drawn up and the next carrier film set can be loaded with a respective number of stiffener assemblies.

Having more than one conveyor belt enables carrier film set 108 to apply number of stiffener assemblies 106 to layup mandrel 102 as additional stiffener assemblies are set in place on a second carrier film set. Once the second carrier film set is prepared with the additional stiffener assemblies, the second carrier film set is ready for being applied to layup mandrel 102 following carrier film set 108.

In some illustrative examples, conveyor system 110 has conveyor belts and respective movement systems positioned parallel to each other. In some illustrative examples, parallel conveyor belt and movement system sets are configured to support the length of the stiffener assemblies of number of stiffener assemblies 106. In some illustrative examples, parallel conveyor belt and movement system sets are configured to mirror surface 122 of layup mandrel 102.

Layup mandrel 102 has any desirable shape or size to receive number of stiffener assemblies 106 from stiffener assembly application system 104 as layup mandrel 102 rotates. In some illustrative examples, layup mandrel 102 may be described as a "barrel" mandrel. In other illustrative examples, layup mandrel 102 is a "half barrel" mandrel. In some illustrative examples, layup mandrel 102 is configured to layup at least a portion of an aircraft fuselage. In some illustrative examples, layup mandrel 102 is configured to layup at least a portion of an aircraft wing.

Figure 2:
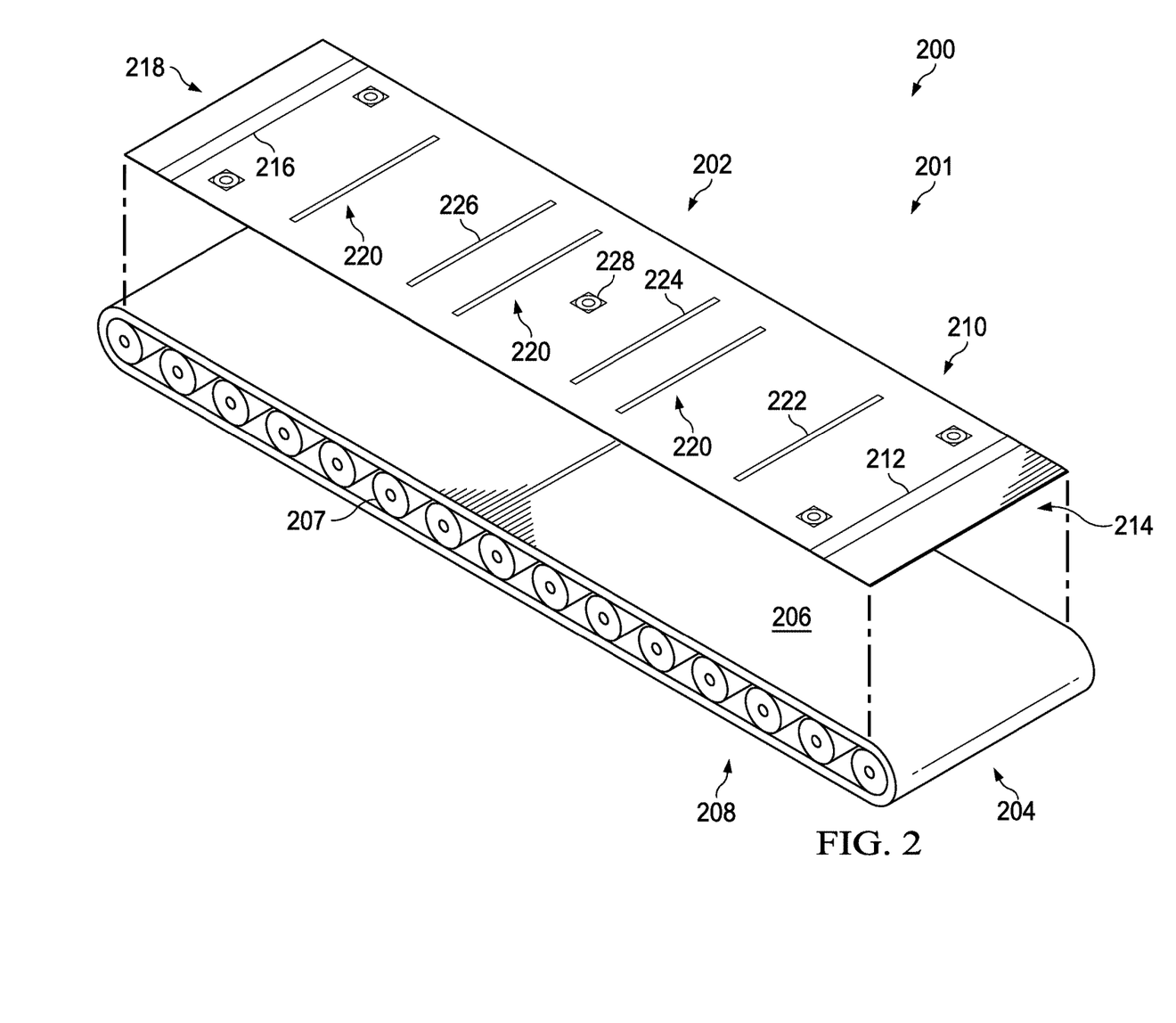
FIG. 2 is an illustration of an isometric view of a stiffener assembly application system in accordance with an illustrative embodiment.

Turning now to FIG. 2, an illustration of an isometric view of a stiffener assembly application system is depicted in accordance with an illustrative embodiment. In view 200, stiffener assembly application system 201 is depicted with carrier film set 202 positioned above conveyor system 204. Stiffener assembly application system 201 is a physical implementation of stiffener assembly application system 104 of FIG. 1. Carrier film set 202 is a physical implementation of carrier film set 108 of FIG. 1. Conveyor system 204 is a physical implementation of conveyor system 110 of FIG. 1.

Stiffener assembly application system 201 is configured to apply a number of stiffener assemblies to a layup mandrel. Conveyor system 204 comprises conveyor belt 206 and movement system 208. Conveyor belt 206 is configured to receive carrier film set 202. A number of stiffener assemblies will be placed onto carrier film set 202 positioned on conveyor system 204. Conveyor belt 206 is configured to support a number of stiffener assemblies in a desired orientation.

As depicted, conveyor belt 206 has a substantially constant cross-section. In some illustrative examples, conveyor belt 206 has features for positioning of carrier film set 202 onto conveyor belt 206. The features for positioning carrier film set 202 onto conveyor belt 206 may be visual or mechanical. For example, conveyor belt 206 may have ridges, lips, indentations, or other physical features for positioning carrier film set 202 onto conveyor belt 206. In some illustrative examples, visual markings may be present on conveyor belt 206 for desirable positioning of carrier film set 202 onto conveyor belt 206.

In some illustrative examples, conveyor belt 206 has a varying cross-section throughout the length of conveyor belt 206. For example, in some non-depicted examples, conveyor belt 206 may have features, such as troughs, configured to support a number of stiffener assemblies.

Movement system 208 is configured to propel carrier film set 202 towards a layup mandrel. Movement system 208 propels carrier film set 202 by driving conveyor belt 206. As depicted, movement system 208 includes rollers 207. Movement system 208 includes any other desirable components for driving conveyor belt 206. For example, movement system 208 may comprise any of a number of motors and a number of belts.

Carrier film set 202 comprises number of alignment features 210 configured to align carrier film set 202 relative to a layup mandrel. As depicted, number of alignment features 210 includes alignment feature 212 associated with first end 214 and alignment feature 216 associated with second end 218 of carrier film set 202.

In some illustrative examples, carrier film set 202 comprises a number of retaining features configured to retain at least a portion of carrier film set 202 on the layup mandrel. As depicted, number of alignment features 210 comprises a number of magnets. The number of magnets also act as number of retaining features to retain carrier film set 202 against the layup mandrel.

Carrier film set 202 is configured to carry a number of stiffener assemblies for applying the number of stiffener assemblies to a layup mandrel. Carrier film set 202 may carry any desirable quantity of stiffener assemblies. As depicted, carrier film set 202 is configured to carrier three stiffener assemblies.

Carrier film set 202 further comprises number of indexing features 220 configured to index the number of stiffener assemblies onto carrier film set 202. As depicted, number of indexing features 220 includes indexing feature 222, indexing feature 224, and indexing feature 226. Each of indexing feature 222, indexing feature 224, and indexing feature 226 take the form of a visible marking for positioning a portion of a respective stiffener assembly. As depicted, number of indexing features 220 comprises a number of visible marks corresponding to a desired location for an edge of a composite charge of a respective stiffener assembly of the number of stiffener assemblies.

In some illustrative examples, number of indexing features 220 is used to position and verify the location of a respective stiffener assembly on carrier film set 202. For example, indexing feature 222 is used to desirably position a composite charge of a respective stiffener assembly. In some illustrative examples, after placing the respective stiffener assembly on carrier film set 202, a position of a respective stiffener assembly is verified by comparing a location of the end of the composite charge to indexing feature 222.

Number of indexing features 220 may be used by either an operator or an automated system. For example, indexing feature 222 may be used to index placement of a stiffener assembly by other an operator or by an automated placement system, such as a pick and place system.

In some illustrative examples, number of indexing features 220 include features for use by an automated system. As depicted, number of indexing features 220 includes fiducials 228. Fiducials 228 may be used by an automated placement system for positioning alignment of the automated placement system relative to carrier film set 202.

Number of indexing features 220 is a non-limiting implementation of number of indexing features 114 of FIG. 1. In some illustrative examples, number of indexing features 220 may include soft targets, reflectors, or other types of indexing features for vision systems of an automated placement system.

Carrier film set 202 includes at least one of a vacuum bag film or a carrier film. In some illustrative examples, carrier film set 202 will remain on the layup mandrel. In some illustrative examples, one film of carrier film set 202 will remain on the layup mandrel. Number of indexing features 220 and number of alignment features 210 are associated with any desirable film in carrier film set 202. In some illustrative examples, at least one of number of indexing features 220 or number of alignment features 210 are part of a film in carrier film set 202 that is pulled away from the layup mandrel as the number of stiffener assemblies are applied to the layup mandrel. In some illustrative examples, at least one of number of indexing features 220 or number of alignment features 210 are part of a film in carrier film set 202 that remains on the layup mandrel during compaction of the number of stiffener assemblies on the layup mandrel.

As depicted, carrier film set 202 has a substantially constant thickness and a substantially constant cross-section. However, in other non-depicted examples, carrier film set 202 has sealing features configured to seal carrier film set 202 against a layup mandrel. For example, carrier film set 202 may have a lip seal.

In other non-depicted examples, carrier film set 202 may have features configured to accommodate the shape of the number of stiffener assemblies. In some illustrative examples, conveyor belt 206 has a varying cross-section throughout the length of conveyor belt 206. For example, in some non-depicted examples, conveyor belt 206 may have features, such as troughs, configured to support a number of stiffener assemblies.

In some illustrative examples, carrier film set 202 applies each of the stiffener assemblies for a composite part to a layup mandrel. In some illustrative examples, carrier film set 202 is one of a number of carrier film sets configured to be loaded in sequence onto conveyor system 204 to apply additional stiffener assemblies to a layup mandrel. Although the other carrier film sets are not depicted, additional carrier film sets may be applied to the same layup mandrel.

When carrier film set 202 is configured to be retained on a layup mandrel, inspection of the number of stiffener assemblies may be performed through carrier film set 202. As depicted, carrier film set 202 has a transparency configured to accommodate visual inspection of the number of stiffener assemblies through carrier film set 202.

Although not visible in FIG. 2, carrier film set 202 has longitudinal reinforcement. The longitudinal reinforcement enables accurate placement of the stiffener assemblies onto the layup mandrel. Carrier film set 202 will be held in tension as it is applied to a rotating layup mandrel. The longitudinal reinforcement reduces undesirable longitudinal stretching that could result in inaccuracies in position of portions of carrier film set 202 relative to the layup mandrel.

The longitudinal reinforcement may be a present in carrier film set 202 in any desirable form. For example, one of the films of carrier film set 202 having at least one of number of indexing features 220 or number of alignment features 210 may be formed of a material having longitudinal reinforcement. As another example, longitudinal reinforcement may be a separate layer added to at least a portion of carrier film set 202.

Stiffener assembly application system 201 is set to align carrier film set 202 with a layup mandrel so when the layup mandrel moves into position the stiffener assemblies are accurately placed onto the layup mandrel. In some illustrative examples, a layup mandrel is moved within a manufacturing environment to position the layup mandrel relative to stiffener assembly application system 201. In some illustrative examples, stiffener assembly application system 201 is moveable within a manufacturing environment such that stiffener assembly application system 201 may be repositioned within the manufacturing environment.

Figure 3:
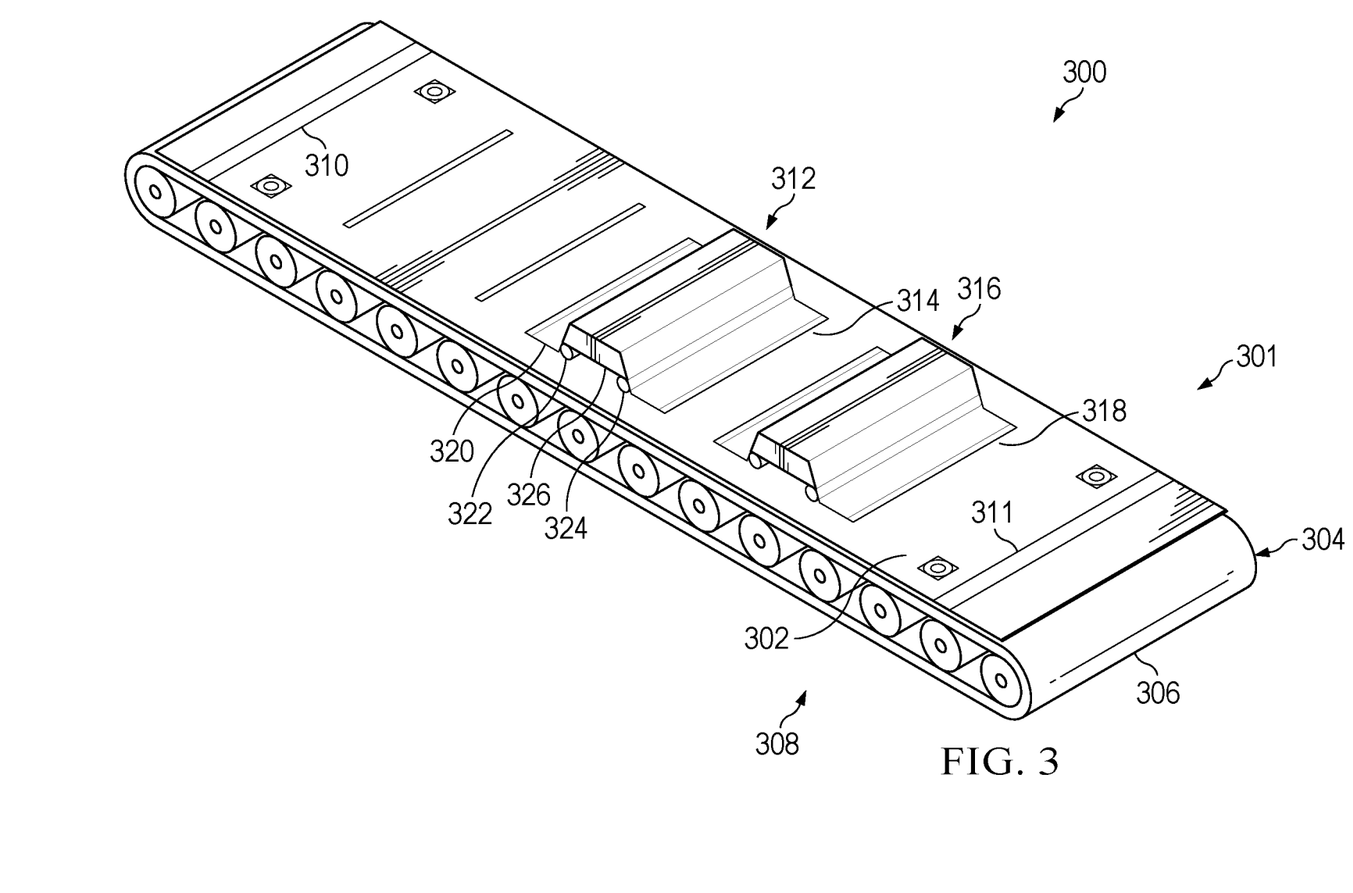
FIG. 3 is an illustration of an isometric view of a number of stiffener assemblies on a stiffener assembly application system in accordance with an illustrative embodiment.

Turning now to FIG. 3, an illustration of an isometric view of a number of stiffener assemblies on a stiffener assembly application system is depicted in accordance with an illustrative embodiment. In view 300 of stiffener assembly application system 301, carrier film set 302 is positioned on conveyor system 304.

Stiffener assembly application system 301 is a physical implementation of stiffener assembly application system 104 of FIG. 1. Carrier film set 302 is a physical implementation of carrier film set 108 of FIG. 1. Conveyor system 304 is a physical implementation of conveyor system 110 of FIG. 1. In some illustrative examples, stiffener assembly application system 301 is the same as stiffener assembly application system 201 of FIG. 2. In some illustrative examples, conveyor system 304 is the same as conveyor system 204 of FIG. 2.

In view 300, carrier film set 302 is positioned on conveyor belt 306. Once a desired quantity of stiffener assemblies has been placed onto carrier film set 302, movement system 308 propels carrier film set 302 towards a layup mandrel to apply the stiffener assemblies to the layup mandrel.

To align carrier film set 302 relative to a layup mandrel, carrier film set 302 has number of alignment features 310. As depicted, number of alignment features 310 comprises a number of magnets. The number of magnets also act as number of retaining features 311 to retain carrier film set 302 against the layup mandrel.

Stiffener assemblies are indexed to carrier film set 302 using a number of indexing features. As depicted, each of the stiffener assemblies is positioned such that flanges formed by the number of composite charges of each respective composite charge are in contact with the carrier film set 302 prior to applying a composite charge to the layup mandrel. As depicted, the radius fillers of each stiffener assembly are in contact with carrier film set 302. However, in other illustrative examples, a composite charge may be present between the radius fillers and carrier film set 302.

As depicted, stiffener assembly 312 is present on carrier film set 302. In view 300, stiffener assembly 312 is positioned onto carrier film set 302 by indexing stiffener assembly 312 to indexing feature 314. In view 300, stiffener assembly 316 is positioned onto carrier film set 302 by indexing stiffener assembly 316 to indexing feature 318.

In view 300, indexing feature 314 is a line. Indexing feature 314 may be used by an operator or an automated placement system. The number of indexing features, including indexing feature 314 and indexing feature 318, are non-limiting implementations of number of indexing features 114 of FIG. 1.

Each of the stiffener assemblies comprises radius fillers, a number of composite charges, and a support. As depicted, stiffener assembly 312 comprises composite charge 320, radius filler 322, radius filler 324, and support 326. In stiffener assembly application system 301 the number of indexing features, including indexing feature 314 and indexing feature 318, is configured to aid in positioning the number of stiffener assemblies using a respective composite charge. For example, indexing feature 314 is configured to aid in positioning stiffener assembly 312 using composite charge 320.

Figure 4:
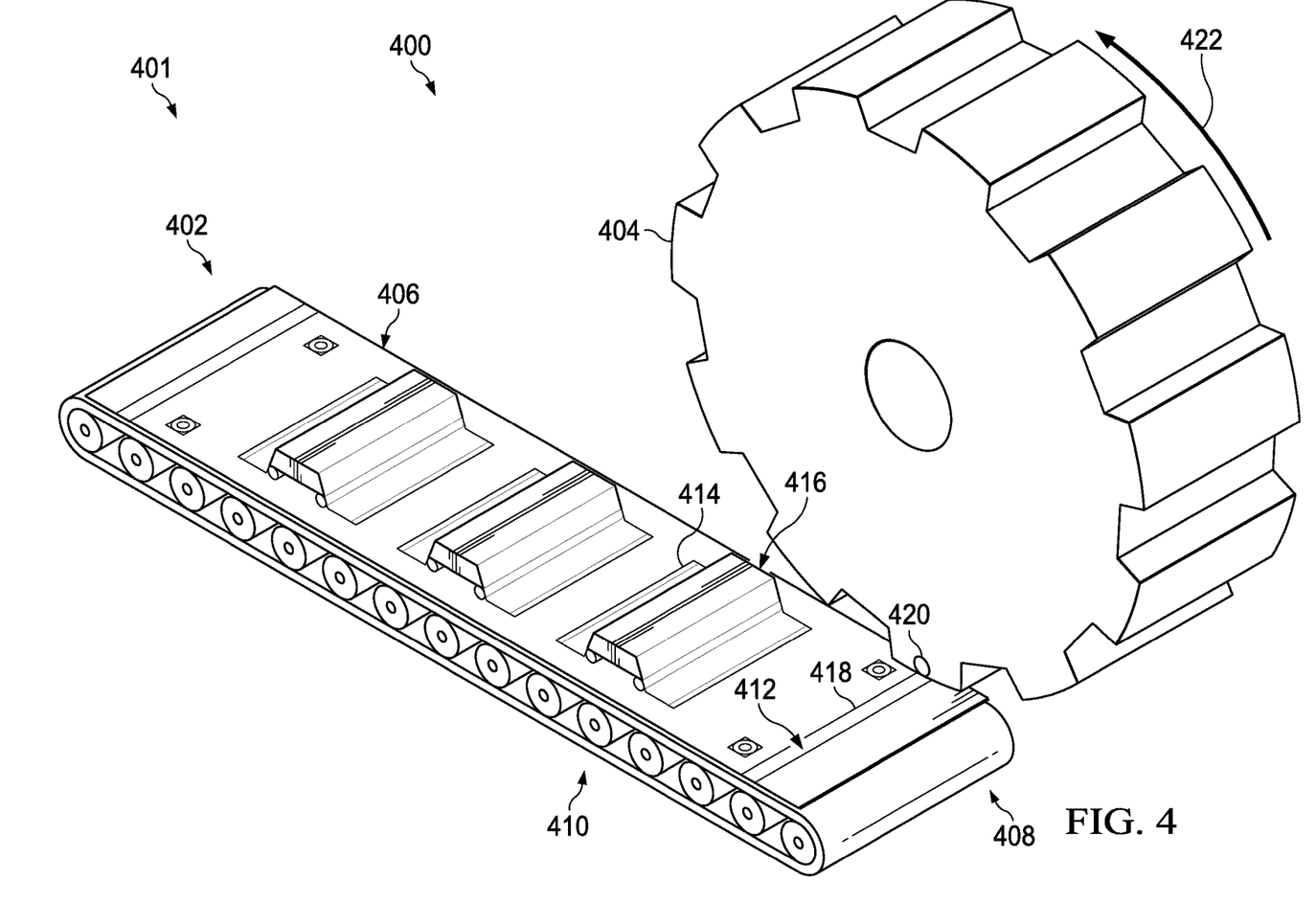
FIG. 4 is an illustration of an isometric view of a stiffener assembly application system prepared to apply a number of stiffener assemblies onto a layup mandrel in accordance with an illustrative embodiment.

Turning now to FIG. 4, an illustration of an isometric view of a stiffener assembly application system prepared to apply a number of stiffener assemblies onto a layup mandrel is depicted in accordance with an illustrative embodiment. Stiffener assembly application system 402 is a physical implementation of stiffener assembly application system 104 of FIG. 1. Carrier film set 406 is a physical implementation of carrier film set 108 of FIG. 1. Conveyor system 408 is a physical implementation of conveyor system 110 of FIG. 1. In some illustrative examples, stiffener assembly application system 402 is the same as at least one of stiffener assembly application system 301 of FIG. 3 or stiffener assembly application system 201 of FIG. 2.

In view 400, stiffener assembly application system 402 and layup mandrel 404 are each positioned such that stiffener assemblies 416 may be applied to layup mandrel 404. Stiffener assembly application system 402 is configured to apply number of stiffener assemblies 416 to layup mandrel 404. Stiffener assembly application system 402 includes carrier film set 406 on conveyor system 408. Conveyor system 408 has movement system 410 configured to propel carrier film set 406 towards layup mandrel 404.

Carrier film set 406 comprises number of alignment features 412 configured to align carrier film set 406 relative to layup mandrel 404 and number of indexing features 414 configured to index number of stiffener assemblies 416 onto carrier film set 406.

Carrier film set 406 is configured to apply number of stiffener assemblies 416 to layup mandrel 404. Carrier film set 406 includes a number of films. In some illustrative examples, carrier film set 406 comprises at least one of a vacuum bag film or a carrier film.

As depicted, number of alignment features 412 comprises alignment feature 418. Alignment feature 418 interacts with alignment feature 420 of layup mandrel 404. As depicted, alignment feature 418 is a magnet. In these illustrative examples, alignment feature 418 aligns carrier film set 406 and retains carrier film set 406 against layup mandrel 404.

After carrier film set 406 is aligned to layup mandrel 404, rotation of layup mandrel 404 applies number of stiffener assemblies 416 to layup mandrel 404. As layup mandrel 404 rotates in direction 422, tension is maintained on carrier film set 406 to enable all stiffener assemblies of number of stiffener assemblies 416 to stay in place and locate properly to layup mandrel 404.

The illustration of manufacturing environment 401 in FIG. 4 is not meant to imply physical or architectural limitations to the manner in which an illustrative embodiment may be implemented. Other components in addition to or in place of the ones illustrated may be used. Some components may be unnecessary.

For example, although a single carrier film set, carrier film set 406, is positioned on conveyor system 408, more than one carrier film set may be positioned on conveyor system 408. By locating two conveyor systems, or two conveyor belts of one conveyor system, end to end, stiffener assemblies can be manufactured and transferred toward the layup mandrel at a nearly constant time. In some illustrative examples, as carrier film set 406 is drawn up, the next carrier film set acts as an independent carrier film set. In some illustrative examples, a second carrier film set may be moved independently of carrier film set 406.

When more than one carrier film set is present on conveyor system 408, number of stiffener assemblies 416 can be set in place on layup mandrel 404, while a second number of stiffener assemblies (not depicted) is prepared on a second carrier film set (not depicted). Once the second number of stiffener assemblies is positioned on the second carrier film set, the second number of stiffener assemblies is ready for placement on layup mandrel 404.

Further, the shapes and relative sizes of number of stiffener assemblies 416 and layup mandrel 404 are not limiting. In some illustrative examples, layup mandrel 404 and number of stiffener assemblies 416 may each be considerably longer than pictured. In some illustrative examples, when number of stiffener assemblies 416 are longer than pictured, carrier film set 406 is wider than pictured in FIG. 4, to carry number of stiffener assemblies 416. In some of these illustrative examples, carrier film set 406 is supported by conveyor system 408 that is also wider than pictured. In some others of these illustrative examples, carrier film set 406 is supported by multiple parallel conveyor systems including conveyor system 408.

As another example, although layup mandrel 404 is depicted as having a constant cross-section, layup mandrel 404 may have a varying cross-section. In some illustrative examples, layup mandrel 404 has an increasing diameter. In some illustrative examples, multiple parallel conveyor systems including conveyor system 408 are positioned to place number of stiffener assemblies 416 on layup mandrel 404 having an increasing diameter. In some of these illustrative examples, the multiple parallel conveyor systems are angled relative to the manufacturing floor to mirror the exterior of layup mandrel 404 and place number of stiffener assemblies 416 on layup mandrel 404 having an increasing diameter. In some of these illustrative examples, at least one conveyor system of the multiple parallel conveyor systems is non-parallel to the manufacturing floor to support and place number of stiffener assemblies 416 on layup mandrel 404 having an increasing diameter. In another illustrative example, conveyor system 408 has adjustable rollers, each roller having joints configured to change the shape of the roller to mirror the exterior of layup mandrel 404.

As depicted, layup mandrel 404 may be described as a "barrel" mandrel. In other non-depicted illustrative examples, layup mandrel 404 is a "half barrel" mandrel. In some illustrative examples, layup mandrel 404 can be used to layup at least a portion of an aircraft fuselage. In some other non-depicted examples, a layup mandrel configured to layup at least a portion of an aircraft wing may be used with a conveyor system, such as conveyor system 408.

Figure 5:
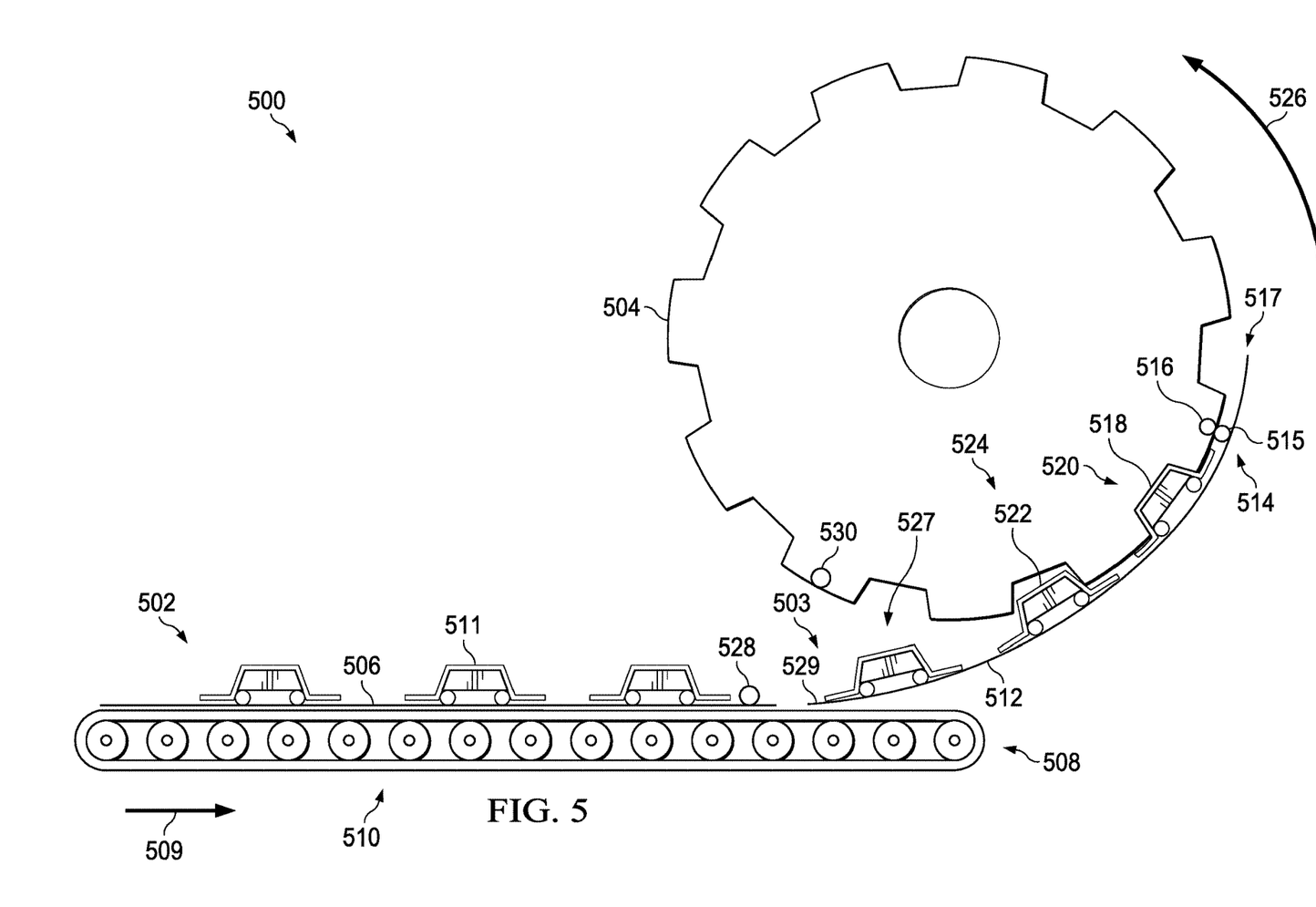
FIG. 5 is an illustration of an isometric view of a stiffener assembly application system applying a number of stiffener assemblies onto a layup mandrel in accordance with an illustrative embodiment.

Turning now to FIG. 5, an illustration of an isometric view of a stiffener assembly application system applying a number of stiffener assemblies onto a layup mandrel is depicted in accordance with an illustrative embodiment. Stiffener assembly application system 502 is a physical implementation of stiffener assembly application system 104 of FIG. 1. Carrier film set 512 is a physical implementation of carrier film set 108 of FIG. 1. Conveyor system 508 is a physical implementation of conveyor system 110 of FIG. 1. In some illustrative examples, stiffener assembly application system 502 is the same as at least one of stiffener assembly application system 402 of FIG. 4, stiffener assembly application system 301 of FIG. 3, or stiffener assembly application system 201 of FIG. 2.

In view 500, stiffener assembly application system 502 is applying number of stiffener assemblies 503 to layup mandrel 504. As depicted, carrier film set 506 is present on conveyor system 508. Carrier film set 506 is propelled towards layup mandrel 504 by movement system 510 of conveyor system 508. Conveyor system 508 moves carrier film set 506 and carrier film set 512 in direction 509. Carrier film set 506 will apply number of stiffener assemblies 511 after carrier film set 512 applies number of stiffener assemblies 503 to layup mandrel 504.

Carrier film set 506 is one of a number of carrier film sets configured to be loaded in sequence onto conveyor system 508 to apply additional stiffener assemblies, including number of stiffener assemblies 511, to layup mandrel 504. Carrier film set 506 may also be referred to as a "second carrier film set."

In view 500, carrier film set 512 is applying number of stiffener assemblies 503 onto layup mandrel 504. As depicted, a portion of carrier film set 512 is still in contact with conveyor system 508, while carrier film set 512 is applying stiffener assembly 518 and stiffener assembly 522 to layup mandrel 504.

Carrier film set 512 has number of alignment features 514 configured to align carrier film set 512 relative to layup mandrel 504. As depicted, alignment feature 515 of number of alignment features 514 takes the form of a magnet. Alignment feature 515 is associated with first end 517. Alignment feature 515 interacts with alignment feature 516 of layup mandrel 504 to align carrier film set 512. Alignment feature 515 positions carrier film set 512 relative to layup mandrel 504 such that number of stiffener assemblies 503 is positioned for application to desired locations of layup mandrel 504.

In this illustrative example, alignment feature 515 also acts as a retaining feature to retain carrier film set 512 on layup mandrel 504. In other non-depicted examples, alignment feature 515 may be separate from a retaining feature of carrier film set 512. For example, alignment feature 515 may take the form of a mechanical feature, a visual feature, or any other desirable type of alignment feature other than a magnetic feature. In some examples, a retaining feature is also present to retain first end 517 on layup mandrel 504. A retaining feature may take any desirable form, such as a mechanical feature, a pneumatic feature, an adhesive, or any desirable retaining feature.

As layup mandrel 504 rotates, layup mandrel 504 keeps tension on carrier film set 512 to enable all of number of stiffener assemblies 503 to stay in place on carrier film set 512 and locate properly to layup mandrel 504. Tension is maintained on carrier film set 512 by rotation 526 of layup mandrel 504 in combination with alignment feature 515 retaining carrier film set 512.

As depicted, stiffener assembly 518 has been positioned in cavity 520 of layup mandrel 504. Stiffener assembly 522 has been positioned in cavity 524. Continued rotation 526 of layup mandrel 504 will place the remaining stiffener assembly, stiffener assembly 527 on layup mandrel 504.

Once each of number of stiffener assemblies 503 is applied to layup mandrel 504, second end 529 is retained to layup mandrel 504. In some illustrative examples, a second magnet is associated with second end 529 of carrier film set 512 to retain carrier film set 512 on layup mandrel 504.

In this illustrative example, carrier film set 512 is maintained against layup mandrel 504 after application of number of stiffener assemblies 503 to layup mandrel 504. Following application of number of stiffener assemblies 503 to layup mandrel 504, operations are performed on stiffener assemblies 503 while carrier film set 512 is present. In some illustrative examples, stiffener assemblies 503 are inspected through carrier film set 512. Inspection through carrier film set 512 may be at least one of a visual inspection, a thermal inspection, or any other desirable type of inspection.

In some illustrative examples, when carrier film set 512 is retained on layup mandrel 504, compaction of number of stiffener assemblies is performed beneath carrier film set 512. In these illustrative examples, carrier film set 512 is utilized as a vacuum bag system. In these illustrative examples, carrier film set 512 is sealed against layup mandrel 504 in any desirable fashion. Carrier film set 512 may be sealed using at least one of an adhesive, a lip seal, a magnetic seal, or any other desirable type of sealing method. In some illustrative examples, carrier film set 512 is sealed directly to layup mandrel 504. In some illustrative examples, at least a portion of carrier film set 512 is sealed to another film or carrier film set.

After number of stiffener assemblies 503 is applied to layup mandrel 504, number of stiffener assemblies 511 is applied to layup mandrel 504. Rotation 526 of layup mandrel 504 and movement of carrier film set 506 in direction 509 places alignment feature 528 of carrier film set 506 near alignment feature 530 of layup mandrel 504.

Alignment feature 528 is associated with a first end of carrier film set 506. Alignment feature 528 interacts with alignment feature 530 of layup mandrel 504 to align carrier film set 506. Alignment feature 528 positions carrier film set 506 relative to layup mandrel 504 such that number of stiffener assemblies 511 is positioned for application to desired locations of layup mandrel 504.

In this illustrative example, alignment feature 528 also acts as a retaining feature to retain carrier film set 506 on layup mandrel 504. In other non-depicted examples, alignment feature 528 may be separate from a retaining feature of carrier film set 506.

After compaction of number of stiffener assemblies 503, carrier film set 512 is removed from layup mandrel 504. After removal of carrier film set 512 from layup mandrel 504, further manufacturing operations, such as automated fiber placement, are performed.

Figure 6:
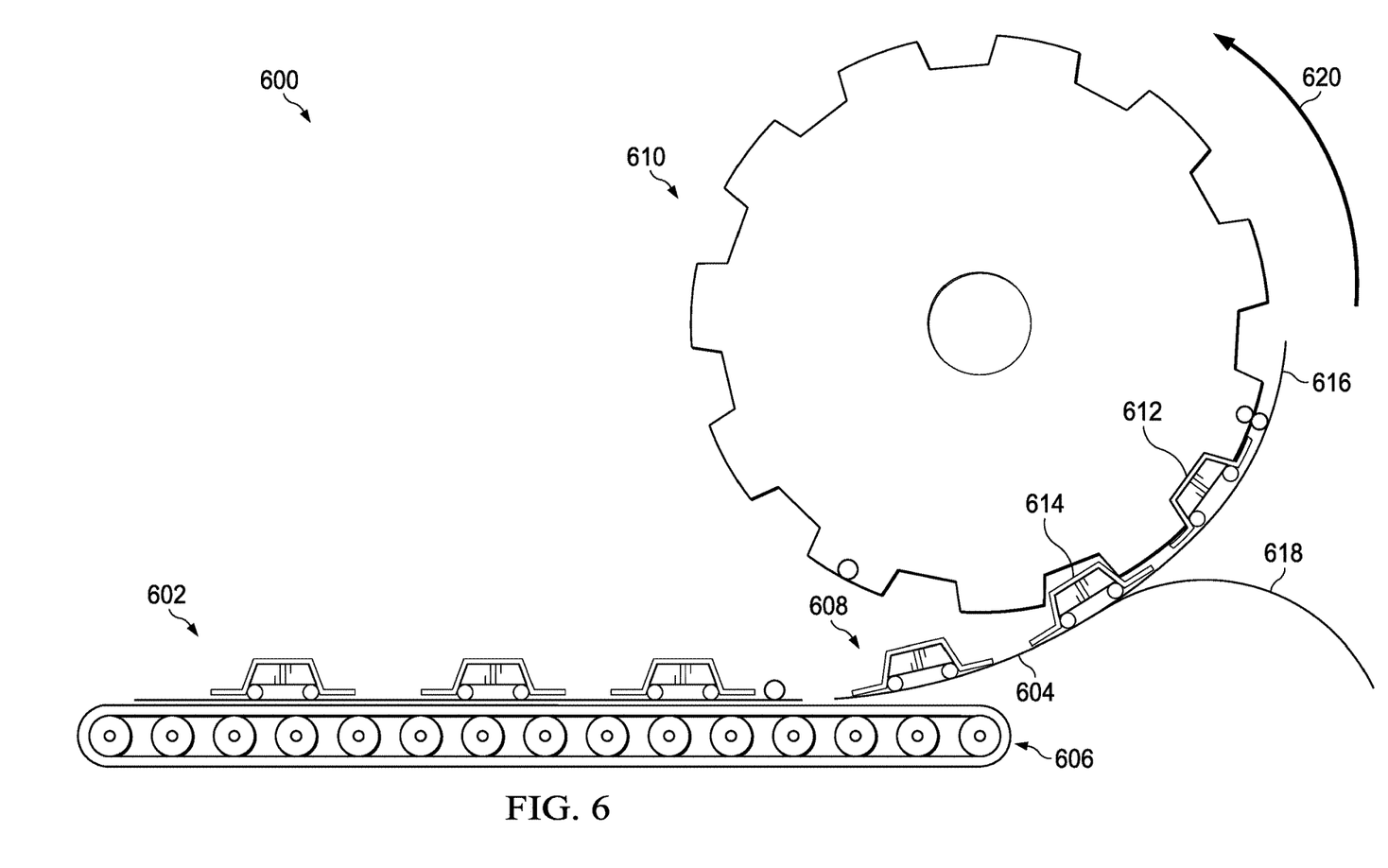
FIG. 6 is an illustration of an isometric view of a stiffener assembly application system applying a number of stiffener assemblies onto a layup mandrel in accordance with an illustrative embodiment.

Turning now to FIG. 6, an illustration of an isometric view of a stiffener assembly application system applying a number of stiffener assemblies onto a layup mandrel is depicted in accordance with an illustrative embodiment. Stiffener assembly application system 602 in view 600 is a physical implementation of stiffener assembly application system 104 of FIG. 1.

Carrier film set 604 of stiffener assembly application system 602 is a physical implementation of carrier film set 108 of FIG. 1. Conveyor system 606 of stiffener assembly application system 602 is a physical implementation of conveyor system 110 of FIG. 1. In some illustrative examples, stiffener assembly application system 602 is the same as at least one of stiffener assembly application system 502 of FIG. 5, stiffener assembly application system 402 of FIG. 4, stiffener assembly application system 301 of FIG. 3, or stiffener assembly application system 201 of FIG. 2.

In view 600, stiffener assembly application system 602 is applying number of stiffener assemblies 608 to layup mandrel 610. As depicted, carrier film set 604 is applying number of stiffener assemblies 608. As depicted, a portion of carrier film set 604 is still in contact with conveyor system 606, while carrier film set 604 is applying stiffener assembly 612 and stiffener assembly 614 to layup mandrel 610.

As depicted, only part of carrier film set 604 is retained on layup mandrel 610. As depicted, film 616 of carrier film set 604 is retained on layup mandrel 610.

As depicted, a portion of carrier film set 604 is removed from layup mandrel 610. As depicted, film 618 is being peeled away from film 616.

Carrier film set 604 has a number of alignment features configured to align carrier film set 604 relative to layup mandrel 610. The number of alignment features may be a component of at least one of film 616 or film 618.

Carrier film set 604 has a number of retaining features configured to retain at least a portion of carrier film set 604 on layup mandrel 610. As depicted, a number of retaining features are associated with film 616.

As layup mandrel 610 rotates, layup mandrel 610 keeps tension on film 616 to enable all of number of stiffener assemblies 608 to stay in place on carrier film set 604 and locate properly to layup mandrel 610. Tension is maintained on film 616 of carrier film set 604 by rotation 620 of layup mandrel 610 in combination with a number of retaining features retaining carrier film set 604.

In this illustrative example, film 616 is maintained against layup mandrel 610 after application of number of stiffener assemblies 608 to layup mandrel 610. Following application of number of stiffener assemblies 608 to layup mandrel 610, operations are performed on stiffener assemblies 608 while film 616 is present. In some illustrative examples, stiffener assemblies 608 are inspected through film 616. Inspection through film 616 may be at least one of a visual inspection, a thermal inspection, or any other desirable type of inspection.

In some illustrative examples, when film 616 is retained on layup mandrel 610, compaction of number of stiffener assemblies 608 is performed beneath film 616. In these illustrative examples, film 616 is utilized as a vacuum bag system. In these illustrative examples, film 616 is sealed against layup mandrel 610 in any desirable fashion. Film 616 may be sealed using at least one of an adhesive, a lip seal, a magnetic seal, or any other desirable type of sealing method. In some illustrative examples, film 616 is sealed directly to layup mandrel 610. In some illustrative examples, at least a portion of film 616 is sealed to another film or carrier film set.

After compaction of number of stiffener assemblies 608, film 616 is removed from layup mandrel 610. After removal of film 616 from layup mandrel 610, further manufacturing operations, such as automated fiber placement, are performed.

In FIGS. 5 and 6, at least a portion of the respective carrier film set is retained on the layup mandrel after the number of stiffener assemblies is applied. For example, carrier film set 512 is retained on layup mandrel 504 after number of stiffener assemblies 503 is placed onto layup mandrel 504. In FIG. 5, carrier film set 512 may be used to compact number of stiffener assemblies 503. As another example, a portion of carrier film set 604 is retained on layup mandrel 610. The portion of carrier film set 604 retained on layup mandrel 610 may be used to compact number of stiffener assemblies 608.

In other non-depicted examples, all of a carrier film set is removed from a respective stiffener assembly after placing the stiffener assembly on the layup mandrel. In these non-depicted examples, a separate vacuum bagging film will be sealed over the number of stiffener assemblies after the number of stiffener assemblies are placed on the layup mandrel.

Figure 7:
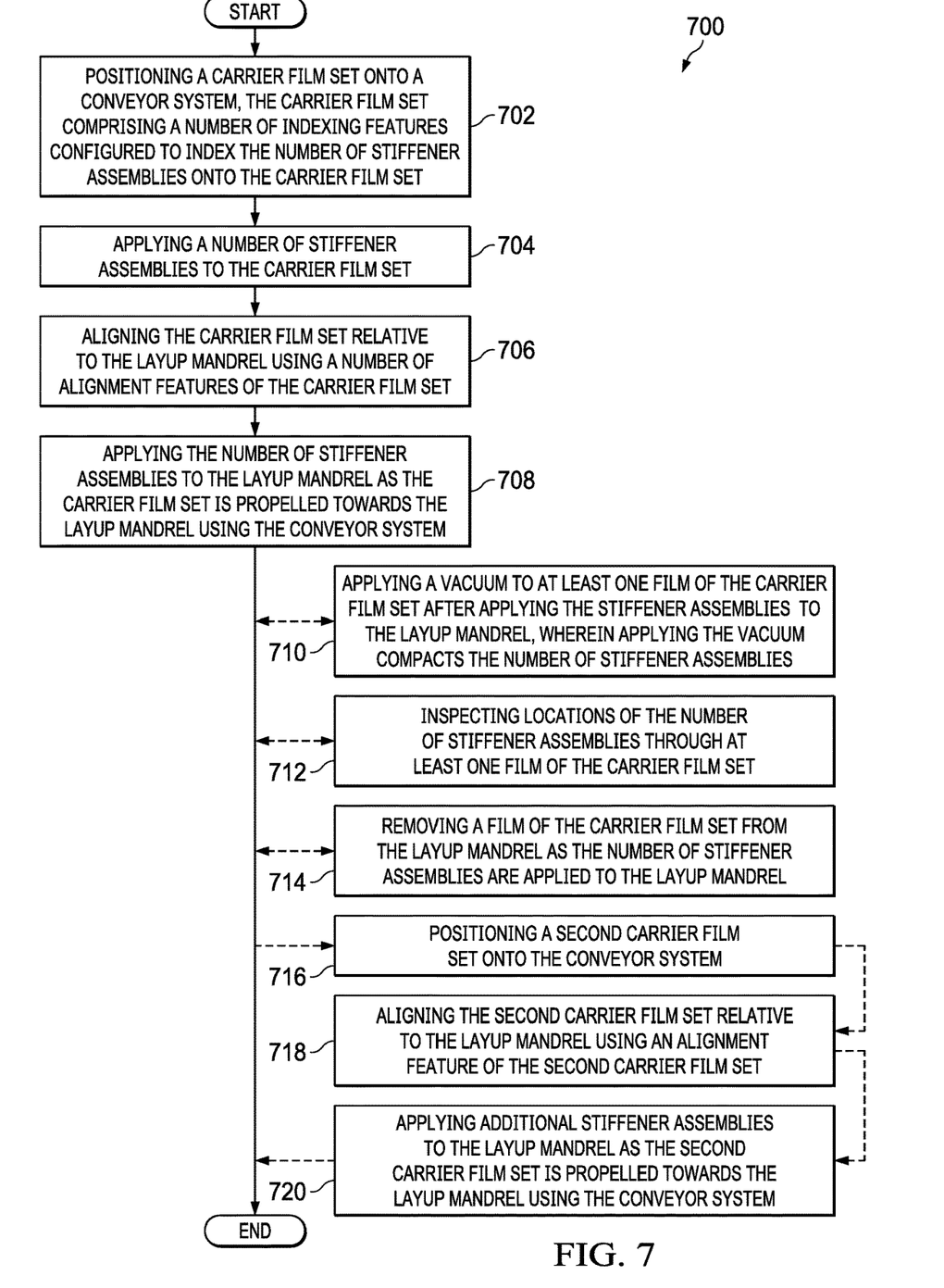
FIG. 7 is an illustration of a flowchart of a method of applying a number of stiffener assemblies to a layup mandrel in accordance with an illustrative embodiment.

Turning now to FIG. 7, an illustration of a flowchart of a method of applying a number of stiffener assemblies to a layup mandrel is depicted in accordance with an illustrative embodiment. Method 700 may be implemented using stiffener assembly application system 104 in manufacturing environment 100 of FIG. 1. Method 700 may be implemented using any of stiffener assembly application system 201 of FIG. 2, stiffener assembly application system 301 of FIG. 3, stiffener assembly application system 402 of FIG. 4, stiffener assembly application system 502 of FIG. 5, or stiffener assembly application system 602 of FIG. 6.

Method 700 positions a carrier film set onto a conveyor system, the carrier film set comprising a number of indexing features configured to index the number of stiffener assemblies onto the carrier film set (operation 702). The carrier film set is retained on the conveyor system by any desirable method. The carrier film set may be retained on the conveyor system by vacuum, friction, adhesive, or in any other desirable fashion.

Method 700 applies a number of stiffener assemblies to the carrier film set (operation 704). The number of stiffener assemblies may be applied manually or by an automated system. Method 700 aligns the carrier film set relative to the layup mandrel using a number of alignment features of the carrier film set (operation 706). The number of alignment features take any desirable form. The number of alignment features may be mechanical, magnetic, visual, or any other desirable type of feature. Method 700 applies the number of stiffener assemblies to the layup mandrel as the carrier film set is propelled towards the layup mandrel using the conveyor system (operation 708). Afterwards, method 700 terminates.

In some illustrative examples, method 700 applies a vacuum to at least one film of the carrier film set after applying the stiffener assemblies to the layup mandrel, wherein applying the vacuum compacts the number of stiffener assemblies (operation 710). In these illustrative examples, the at least one film of the carrier film set is configured to be sealed to the layup mandrel.

In some illustrative examples, method 700 inspects locations of the number of stiffener assemblies through at least one film of the carrier film set (operation 712). The number of stiffener assemblies is inspected in any desirable way. In some illustrative examples, the number of stiffener assemblies is inspected visually. In these illustrative examples, the at least one film of the carrier film set is sufficiently transparent to allow for visual inspection of the number of stiffener assemblies through the at least one film.

In some illustrative examples, method 700 removes a film of the carrier film set from the layup mandrel as the number of stiffener assemblies are applied to the layup mandrel (operation 714). In some illustrative examples, carrier film set is only one film. In these illustrative examples, removing the single film leaves the number of stiffener assemblies on the layup mandrel uncovered. In these illustrative examples, a vacuum bagging material is sealed over each respective stiffener assembly after removing the film from the stiffener assembly. The vacuum bagging material is used to compact the number of stiffener assemblies. The vacuum bagging material is not part of the carrier film set.

In other illustrative examples, the film of the carrier film set is only one of a plurality of films in the carrier film set. In these illustrative examples, at least one other film of the carrier film set remains on the layup mandrel. In these illustrative examples, the at least one other film is used to compact the number of stiffener assemblies.

In some illustrative examples, method 700 positions a second carrier film set onto the conveyor system (operation 716), aligns the second carrier film set relative to the layup mandrel using an alignment feature of the second carrier film set (operation 718), and applies additional stiffener assemblies to the layup mandrel as the second carrier film set is propelled towards the layup mandrel using the conveyor system (operation 720). Any desirable quantity of carrier film sets is used to apply stiffener assemblies to a layup mandrel.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 710 through 720 of FIG. 7 may be optional.

Figure 8:
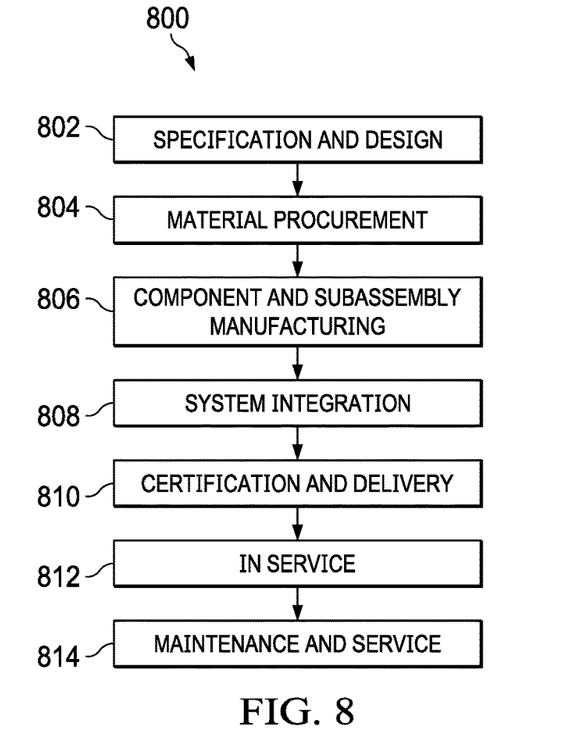
FIG. 8 is an illustration of an aircraft manufacturing and service method in a form of a block diagram in accordance with an illustrative embodiment.
Figure 9:
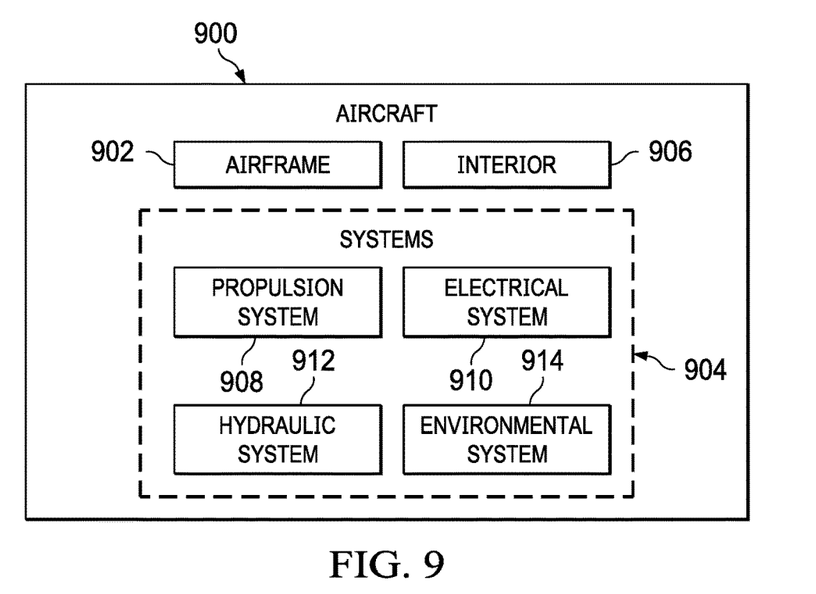
FIG. 9 is an illustration of an aircraft in a form of a block diagram in which an illustrative embodiment may be implemented.

Illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 of FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800. One or more illustrative embodiments may be used during at least one of component and subassembly manufacturing 806, system integration 808, or maintenance and service 814 of FIG. 8. For example, stiffener assembly application system 104 of FIG. 1 may be used during component and subassembly manufacturing 806 to form airframe 902. As an example, at least one of method 700 may be used during component and subassembly manufacturing 806 to form airframe 902. As another illustrative example, stiffener assembly application system 104 may be used to manufacture a component for use in maintenance and service 814. In some illustrative examples, method 700 may be used to manufacture portions of aircraft 900 such as portions of interior 906.

The illustrative examples place stiffener assemblies, also referred to as "kitted stringers", on a highly toleranced conveyer belt and rotates them through in coordination with a rotating layup mandrel. The layup mandrel and conveyer belt interact at the lowest point and the stiffener assemblies are transferred and installed into the mandrel.

The illustrative examples reduce the manpower for installation of stiffener assemblies onto a layup mandrel. The illustrative examples also provide an ergonomic and safety benefit to installation of stiffener assemblies. The illustrative examples enable the transport/storage portion of a system for manufacturing stiffeners offline. As transport of stiffener assemblies is reduced, a quantity of trays or other layup tooling for the stiffener assemblies may be reduced. Reducing tooling, such as trays, could reduce capital expenditures for manufacturing. Reducing a quantity of layup trays reduces the upfront cost of tooling.

The illustrative examples would be a more efficient process for stiffener assembly manufacturing and placement. The illustrative examples receive stiffener assemblies from multiple work stations into one stiffener assembly application system for application to a layup mandrel.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A carrier film set configured to apply a number of stiffener assemblies to a layup mandrel, the carrier film set comprising:
a first film and a second film, wherein the first film is a vacuum bag film and the second film is a carrier film;
a number of alignment features associated with the first film or the second film and configured to align the carrier film set relative to the layup mandrel;
a number of indexing features associated with the first film or the second film and configured to index the number of stiffener assemblies onto the carrier film set; and
wherein the first film is configured to be retained on the layup mandrel after application of the number of stiffener assemblies to the layup mandrel and the second film is configured to be removed from the layup mandrel after application of the number of stiffener assemblies to the layup mandrel.

2. The carrier film set of claim 1, wherein the carrier film set has a flexibility configured to conform the carrier film set to a surface of the layup mandrel.

3. The carrier film set of claim 1 further comprising a number of retaining features configured to retain at least a portion of the carrier film set on the layup mandrel.

4. The carrier film set of claim 1, wherein at least a portion of the carrier film set is configured to be retained on the layup mandrel, and wherein the at least a portion of the carrier film set has a transparency configured to accommodate visual inspection of the number of stiffener assemblies through the at least a portion of the carrier film set.

5. The carrier film set of claim 1, wherein the number of alignment features comprises a number of magnets.

6. The carrier film set of claim 1, wherein the number of alignment features comprises an alignment feature associated with a first end of the carrier film set and an alignment feature associated with a second end of the carrier film set.

7. The carrier film set of claim 1, wherein the number of indexing features comprises a number of visible marks corresponding to a desired location for an edge of a composite charge of a respective stiffener assembly of the number of stiffener assemblies.

8. The carrier film set of claim 1, wherein each of the number of stiffener assemblies comprises radius fillers, a number of composite charges, and a support, and wherein flanges formed by the number of composite charges of each respective composite charge are in contact with the carrier film set prior to applying a composite charge to the layup mandrel.

9. The carrier film set of claim 1 further comprising longitudinal reinforcement.

10. A stiffener assembly application system configured to apply a number of stiffener assemblies to a layup mandrel, the stiffener assembly application system comprising:
a carrier film set comprising a number of alignment features configured to align the carrier film set relative to the layup mandrel and a number of indexing features configured to index the number of stiffener assemblies onto the carrier film set; and
a conveyor system having a movement system configured to propel the carrier film set towards the layup mandrel, wherein the conveyor system further comprises a conveyor belt configured to support the number of stiffener assemblies in a desired orientation.

11. The stiffener assembly application system of claim 10, wherein the carrier film set is one of a number of carrier film sets configured to be loaded in sequence onto the conveyor system to apply additional stiffener assemblies to the layup mandrel.

12. The stiffener assembly application system of claim 10, wherein each of the number of stiffener assemblies comprises radius fillers, a number of composite charges, and a support, and wherein the number of indexing features are configured to aid in positioning the number of stiffener assemblies using a respective composite charge.

13. The stiffener assembly application system of claim 10, wherein the carrier film set has a flexibility configured to conform the carrier film set to a surface of the layup mandrel.

14. The stiffener assembly application system of claim 10 further comprising a number of retaining features configured to retain at least a portion of the carrier film set on the layup mandrel.

15. The stiffener assembly application system of claim 10, wherein at least a portion of the carrier film set is configured to be retained on the layup mandrel, and wherein the at least a portion of the carrier film set has a gas impermeability sufficient to utilize the at least a portion of the carrier film set as a vacuum bagging material.

16. A method of applying a number of stiffener assemblies to a layup mandrel, the method comprising:
positioning a carrier film set onto a conveyor system, the carrier film set comprising a number of indexing features configured to index the number of stiffener assemblies onto the carrier film set, the conveyor system comprising a movement system configured to propel the carrier film set towards the layup mandrel and a conveyor belt configured to support the number of stiffener assemblies in a desired orientation;
applying a number of stiffener assemblies to the carrier film set;
aligning the carrier film set relative to the layup mandrel using a number of alignment features of the carrier film set; and
applying the number of stiffener assemblies to the layup mandrel as the carrier film set is propelled towards the layup mandrel using the conveyor system.

17. The method of claim 16 further comprising:
applying a vacuum to at least one film of the carrier film set after applying the number of stiffener assemblies to the layup mandrel, wherein applying the vacuum compacts the number of stiffener assemblies.

18. The method of claim 16 further comprising:
inspecting locations of the number of stiffener assemblies through at least one film of the carrier film set.

19. The method of claim 16 further comprising:
positioning a second carrier film set onto the conveyor system;
aligning the second carrier film set relative to the layup mandrel using an alignment feature of the second carrier film set; and
applying additional stiffener assemblies to the layup mandrel as the second carrier film set is propelled towards the layup mandrel using the conveyor system.

20. The method of claim 16 further comprising:
removing a film of the carrier film set from the layup mandrel as the number of stiffener assemblies are applied to the layup mandrel.

\* \* \* \* \*